Patented Sept. 2, 1941

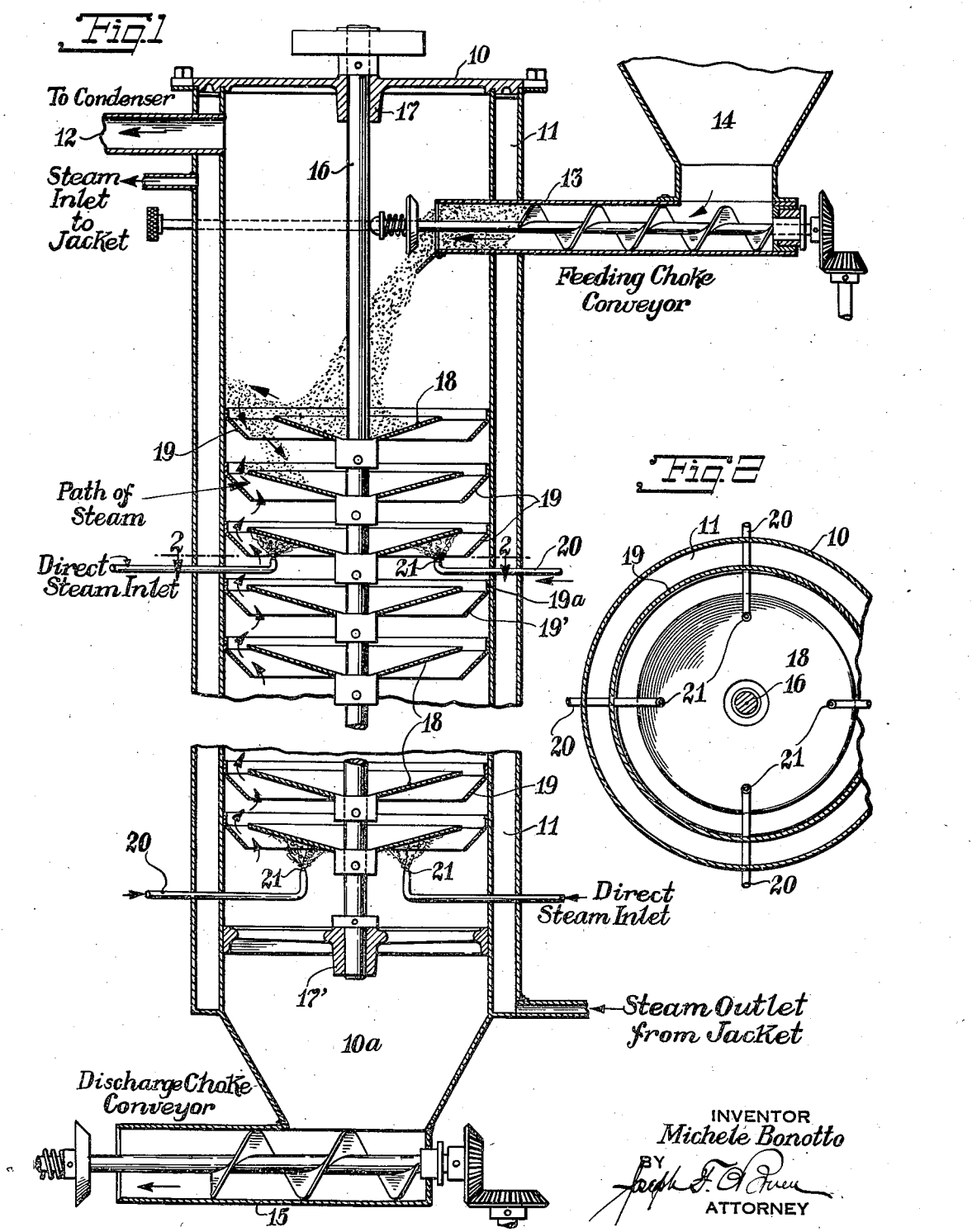

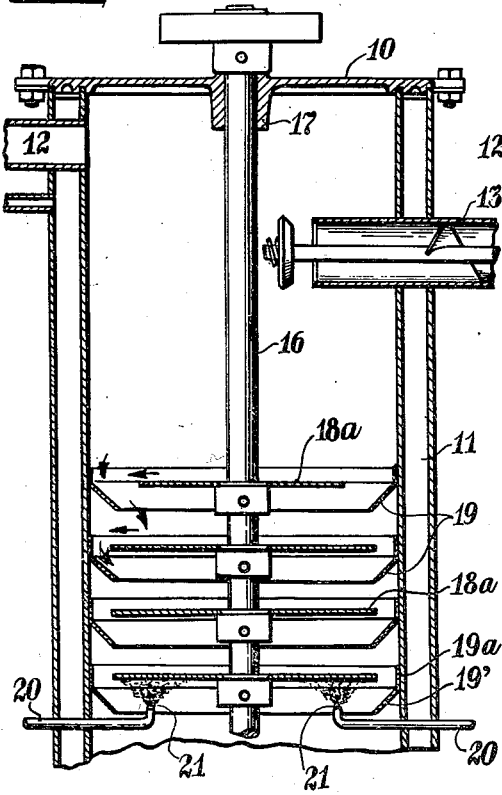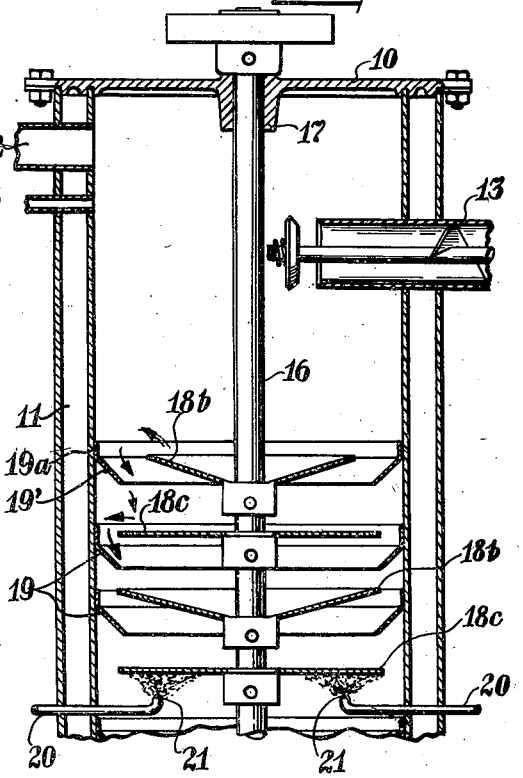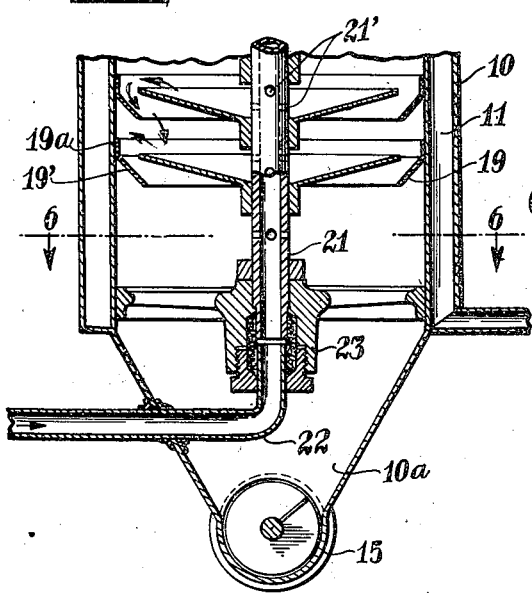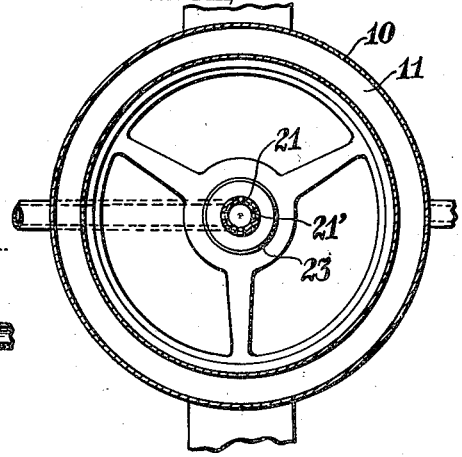

2,254,867

UNITED STATES PATENT OFFICE 2,254,867

PROCESS FOR CONTINUOUS TREATMENT OF EXHAUSTED SOLVENT-IMPREGNATED SOLID AGGLUTINATIVE ORGANIC MATERIAL

Michele Bonotto, Evansville, Ind., assignor to Extractol Process, Ltd., Wilmington, Del., a corporation of Delaware Application October 11, 1937, Serial No. 168,446

4 Claims. (Cl. 202—8)

This invention relates to improvements in process for continuous treatment of exhausted, solvent-impregnated solid agglutinative organic materials from solvent extraction systems.

In systems for the extraction of oil by solvent from solid materials, it is a common practice, after the oil extraction is completed, to treat the exhausted solids with heat and steam in order to recover the solvent with which the mass is impregnated and to free the same from any traces of the solvent. In such conventional treatment, the solvent-impregnated solid material is first heated in special steam-jacketed containers which are connected with suitable condensers. The solvent is evaporated during such treatment and is then condensed and recovered. In practicing this heat treatment, however, it has been found that it is not possible to eliminate all traces of solvent occluded in the structure of the extracted material without subjecting the material to high temperatures with consequent detrimental effects on the quality of the extracted material. For that reason, it has also been common practice to blow a relatively small amount of steam directly into the mass of extracted material, whereby the elimination of solvent is facilitated, both by the lowering of the boiling point in the two-phase distillation system so created and by the mechanical driving or steam-entraining action of the steam passing through a mass of such material.

The above practice is widely used after the extraction of oil from oil-bearing seeds, especially in the continuous extraction systems and is carried out in several different ways and in differently designed apparatus. When, however, a large percentage of starch is contained in the seeds or, as in the case of flax seed, a mucilaginous substance is present, great difficulty and trouble is encountered when a part of the direct steam condenses in the mass of exhausted meal during the direct steam treatment, described above. The starch is gelatinized and/or the mucilaginous substance is quickly hydrated, with the result that the meal under treatment is transformed into a gluey mass, more or less compact, and the passing of the steam through that mass is greatly hindered.

When a treatment of the character above described, is carried out, for example, in an apparatus having a special screw conveyor in which direct steam is blown during the traveling of the extracted material to be treated, a sort of conglomerating or balling up of the material occurs with the result, as experience has shown, that the elimination of the solvent is not complete, because inside the conglomerate portions or balls, unreleased solvent is present in relatively large quantities. Several methods have been adopted to overcome the above difficulties but all such methods of which I have knowledge have been based on heating the material from which the solvent is to be eliminated at temperatures high enough to avoid condensation of the steam. But in carrying out that practice the quality of the meal is greatly impaired; the color is damaged and the chemical quality of the protein present in the meal is altered, all of which has a detrimental effect on the price at which the extracted meal can be marketed.

One of the objects of my invention is the provision of a method that will eliminate from such solvent-impregnated exhausted material all traces of solvent without subjecting such material to severe heat-treatment such as above described.

Another object of my invention is to provide a method which will centrifugate, or scatter by centrifugal motion, the particles of the exhausted solid material to procure an initial separation of such particles and by the same force will throw such particles against a heated surface preferably comprising the steam-jacketed walls of a container and preferably will cause this operation to be repeated a given number of times successively.

Another object of my invention is to provide for the treatment of such centrifugated particles by direct steam, and preferably to provide for the blowing of steam directly through the separated particles so scattered by centrifugal motion.

Still another object of my invention is to treat oil-exhausted, solvent impregnated material to eliminate solvent therefrom by providing a series of successively-arranged centrifugating elements, continuously feeding a stream of such material to the first of said elements, centrifugating in said first element a quantity of such material to scatter the particles thereof, throwing the scattered particles against a heated surface, causing the said quantity of material to drop by gravity and to be deflected into the succeeding centrifugating elements in a series of successive step-like operations, and blowing steam directly through the moving particles.

Still another object of my invention is to provide a method for blowing steam through the moving scattered particles, and preferably providing a method for such direct steam blowing at different superposed zones or levels so as to enable the quality or character of the steam (viz., dry, wet or superheated) to be employed in such superposed zones in accordance with the kind of meal that is being treated and the kind or type of meal it is desired to produce therefrom.

With these and other objects in view, the invention comprises the combination of members and arrangement of parts so combined as to co-act and co-operate with each other in the performance of the functions and the accomplishment of the results herein contemplated, and comprises in one of its adaptations the species or preferred form illustrated in the accompanying drawings, in which:

Fig. 1 is a fragmentary vertical section of my preferred form of treating apparatus;

Fig. 2 is a section on the line 2—2 of Fig. 1, looking in the direction of the arrows;

Fig. 3 is a fragmentary vertical section of a modified form of apparatus embodying my invention;

Fig. 4 is a similar view of another slightly modified form of apparatus, and

Figs. 5 and 6 are a fragmentary vertical section and a transverse section of another modification.

Referring now to Figs. 1 and 2 of these drawings, my preferred form of apparatus in which the operation of eliminating the last traces of solvent from the extracted meal is carried on, consists of a vertical, cylindrical tank 10 provided with a steam jacket 11 and having an outlet-conduit 12 at the upper part through which the steam, introduced into the apparatus together with the solvent vapors find their way into a suitable condenser, not shown. Also at the upper part of the apparatus, a feeding choke-conveyor 13 introduces the meal which is to be treated into the center of the apparatus from a suitable hopper 14. At the bottom of the apparatus a choke-conveyor 15 is provided to discharge the finished meal.

Through the center of the tank 10 an axial shaft 16, driven from a suitable source of power, revolves in bearings 17, 17'. A series of dish-shaped discs 18 are fixed to the shaft 16 and revolve with it. The speed of the shaft 16 is regulated according to the degree of the fineness of the material to be treated in order to create just the centrifugal force necessary to throw the particles of the material being treated against the jacketed walls of the tank.

Within the tank, on the jacketed wall thereof, suitable deflectors 19 are arranged between the discs 18. As illustrated, the deflectors comprise inclined, conical baffles 19' having annular flanges 19a welded to the internal surface of the tank so that the heat generated along the walls of the steam-jacketed apparatus will be transferred to the baffles and thus prevent the condensation of steam on them.

Direct steam is introduced inside the apparatus by suitable conduits 20 and blown through suitable nozzles 21. The location of these nozzles is arranged according to the length of the apparatus; they may be located in the lower part of the apparatus or at different superposed levels. When such an apparatus is designed of sufficient height, the steam may be injected through several superposed inlets as illustrated in Fig. 1. The quality of the steam,—dry, wet, or superheated,—and the various degrees of superheating sometimes is an important factor to be taken into consideration when a special kind of meal is to be produced. By introducing the proper kind of steam into the different superposed zones, varying conditions may be met. For instance, starting from the top, a saturated steam may be injected in the first row of nozzles if some condensation is desired in the first stage of the operation; a dry steam may be injected in the next or second row of nozzles from the top, should it be desired to keep the meal for a certain length of time at a given temperature without condensation and, finally, a dry, superheated steam may be injected in the third row or at the bottom of the apparatus if it is desirable that some moisture should be eliminated from the treated meal to meet requirements for the marketing of the finished product.

Direct steam may, as illustrated in Figs. 5 and 6, be introduced, also, through a hollow rotating shaft 21 provided with suitable openings or perforations 21' at desired locations.

One of the advantages of my invention is that the operation is continuous and in countercurrent, and all the difficulties resulting from the presence of starch or mucilaginous or similar substances are eliminated. By keeping the material moving in a loose state, even if some of the steam does condense on the loose, moving particles, such particles will not be allowed to stick together to form conglomerate or balls during the treatment.

The discharging conveyor discharges at a higher rate than the feeder and the discharged meal may be sent through a suitable air-cooling or conveying system.

In Fig. 3, flat centrifugating discs 18a are employed and in Fig. 4 a combination of both flat discs 18b and dish-shaped discs 18c are utilized. In other respects, the apparatus is similar to that described in relation to Figs. 1 and 2.

The operation of my apparatus is as follows:

At a proper speed the meal to be treated is fed to the center of the tank by the feeding choke-conveyor 13 located at the top and falls by gravity into the first dish-shaped rotating disc 18 and the stream so fed, which will be of suitable volume, is scattered into particles and thrown by the centrifugal force against the steam-jacketed wall of the apparatus, following an outward and upward direction according to the shape of the disc. After hitting the wall, the material will fall vertically on the first conical shaped, heated deflector or baffle, from which it will slide into the next successive disc to be again thrown by centrifugal force against the wall of the apparatus, and then by gravity to fall on the next conical shaped deflector or baffle from which it will again slide into the next disc and so on until the stream reaches the lowermost disc from which it is again centrifugated and thrown against the jacketed wall and then deflected into the discharge chamber 10a from which it is discharged by the choke-conveyor 15.

As an alternative, perfectly horizontal, rotating discs may be employed, or a combination of both, as above stated.

The steam passing from the lower part rises toward the top of the container, following a tortuous path between the edges of the rotating discs and the conical deflectors or baffles and, during such rising movement, meeting the downwardly-traveling meal which is in this way subjected to the action of the steam while in continuous movement, said rising steam and entrained solvent finally reaching and passing through an outlet-conduit 12 such as shown in Figs. 1, 3 and 4, to a suitable condenser, after which the condensed steam and solvent are separated in conventional manner.

Having described my invention, I claim:

1. The process for the continuous treatment of exhausted solvent-impregnated solid agglutinative organic materials consisting in continuously feeding within a container a stream of such solvent-impregnated material, centrifugating the particles composing said stream, subjecting such material during such centrifugation to the solvent entraining action of a current of steam passed through said container, continuously discharging such material from the container, condensing the steam and entrained solvent, and separating the solvent from the condensed steam.

2. The process for the continuous treatment of exhausted solvent-impregnated solid agglutinative organic materials consisting in continuously feeding within a container a stream of such solvent-impregnated material, centrifugating the particles composing said stream, then guiding said particles to drop by gravity through a free space within said container, passing solvent-entraining currents of steam through said container in counter-current with the movement of said particles, continuously discharging such material from the container, condensing the steam and entrained solvent, and separating the solvent from the condensed steam.

3. The process for the continuous treatment of exhausted solvent-impregnated solid agglutinative organic materials consisting in continuously feeding within a heated container a stream of such solvent-impregnated material, continuously centrifugating the particles composing said stream, guiding such particles to fall by gravity within the container, successively repeating the operations of centrifugating and guiding such particles a plurality of times in a series of step by step movements, blowing solvent-entraining jets of steam at a plurality of levels directly through said particles during such centrifugal and gravity movements thereof, continuously discharging such material from the container, condensing the steam and entrained solvent, and separating the solvent from the condensed steam.

4. The process for the continuous treatment of exhausted solvent-impregnated solid agglutinative organic materials consisting in continuously feeding within a heated container a stream of such solvent-impregnated material, centrifugating the particles composing said stream, also by the same centrifugal movement throwing the centrifugated particles against a heated surface, guiding such particles to move by gravity through a free space, repeating the operation successively with respect to a given quantity of particles a plurality of times in a series of step by step movements, blowing solvent-entraining jets of steam at a plurality of levels directly through said particles during such centrifugal and gravity movements thereof, continuously discharging the treated material from the container, condensing the steam and entrained solvent, and separating the solvent from the condensed steam.

MICHELE BONOTTO.